United States Patent
Xie et al.

(10) Patent No.: US 8,795,464 B2
(45) Date of Patent: Aug. 5, 2014

(54) REVERSIBLE WELDING PROCESS FOR POLYMERS

(75) Inventors: Tao Xie, Troy, MI (US); Xingcheng Xiao, Troy, MI (US); Ruomiao Wang, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 926 days.

(21) Appl. No.: 12/367,826

(22) Filed: Feb. 9, 2009

(65) Prior Publication Data

US 2010/0203342 A1    Aug. 12, 2010

(51) Int. Cl.
*B29C 65/02* (2006.01)
*B29C 61/06* (2006.01)
*B29C 65/76* (2006.01)
*B29C 65/00* (2006.01)

(52) U.S. Cl.
CPC ............ *B29C 61/06* (2013.01); *B29C 65/76* (2013.01); *B29C 66/90* (2013.01)
USPC ......... 156/308.2; 156/247; 156/709; 156/711

(58) Field of Classification Search
CPC .......... B29C 61/06; B29C 65/76; B29C 66/90
USPC .............. 156/247, 308.2, 311, 344, 701, 709, 156/711
See application file for complete search history.

(56) References Cited

U.S. PATENT DOCUMENTS

| | | | |
|---|---|---|---|
| 5,755,913 A | 5/1998 | Liaw et al. | |
| 6,156,842 A * | 12/2000 | Hoenig et al. | 525/171 |
| 6,759,481 B2 | 7/2004 | Tong | |
| 6,773,535 B1 | 8/2004 | Wetzel | |
| 6,827,325 B2 | 12/2004 | Hofmann et al. | |
| 6,986,855 B1 | 1/2006 | Hood et al. | |
| 7,188,498 B2 | 3/2007 | Browne et al. | |
| 2001/0047579 A1 | 12/2001 | Lee et al. | |
| 2005/0151385 A1 | 7/2005 | Autumn et al. | |
| 2005/0167556 A1 | 8/2005 | Fontana et al. | |
| 2005/0240190 A1 | 10/2005 | Gall et al. | |

(Continued)

FOREIGN PATENT DOCUMENTS

WO    WO 2008/028224    *   3/2008    .............. B29C 65/02

OTHER PUBLICATIONS

Xiao, U.S. Appl. No. 12/273,083, Self-Healing and Scratch Resistant Shape Memory Polymer System, filed Nov. 18, 2008.

(Continued)

*Primary Examiner* — Katarzyna Wyrozebski Lee
*Assistant Examiner* — John Blades
(74) *Attorney, Agent, or Firm* — BrooksGroup

(57) ABSTRACT

One exemplary method includes providing a first polymer and a second polymer each comprising a first shape memory polymer backbone having at least one surface free side chain, the first polymer and the second polymer each transformable between a permanent shape and a temporary shape; creating an adhesive bond between the first polymer and the second polymer, wherein the creating of the adhesive bond transforms the first polymer to its temporary shape and transforms the second polymer to its temporary shape; and wherein the at least one surface free chain of the first polymer in its temporary shape is interdiffused with the at least one surface free chain of the second polymer in its temporary shape by the creation of the adhesive bond.

16 Claims, 4 Drawing Sheets

(56) References Cited

U.S. PATENT DOCUMENTS

| | | |
|---|---|---|
| 2005/0274455 A1 | 12/2005 | Extrand |
| 2006/0036045 A1 | 2/2006 | Wilson et al. |
| 2006/0156535 A1 | 7/2006 | Browne et al. |
| 2007/0073130 A1 | 3/2007 | Finch et al. |
| 2007/0289786 A1 | 12/2007 | Cutkosky et al. |
| 2009/0277579 A1* | 11/2009 | Marelli et al. ............... 156/293 |

OTHER PUBLICATIONS

Xie, U.S. Appl. No. 11/867,531, Reversible Dry Adhesives, filed Oct. 4, 2007.

Xie, U.S. Appl. No. 12/396,045, Polymer Systems with Multiple Shape Memory Effect, filed Mar. 2, 2009.

Xie, U.S. Appl. No. 12/367,826, A Reversible Welding Process for Polymers, filed Feb. 9, 2009.

Xie, U.S. Appl. No. 12/178,844, High Strength Reversible Noncovalent Adhesion Methods for a Solid Polymer-Polymer Interface, filed Jul. 24, 2008.

Cheng, U.S. Appl. No. 12/359,709, Remote Activation of Thermo-Reversible Dry Adhesives, filed Jan. 26, 2009.

Xie, U.S. Appl. No. 12/423,947, Shape Memory Polymer and Adhesive Combination and Methods of Making and Using the Same, filed Apr. 15, 2009.

Xie, U.S. Appl. No. 12/432,211, Shape Memor Polymers with Surface Having Dangling Adhesive Polymeric Chains and Methods of Making and Using the Same, filed Apr. 29, 2009.

Xie, U.S. Appl. No. 12/181,562, Polymer Systems with Multiple Shape Memory Effect, filed Jul. 29, 2008.

Xie, U.S. Appl. No. 11/867,549, Method of Miniimizing Residue Adhesion for Thermo-Reversible Dry Adhesives, filed Oct. 4, 2007.

Xie, U.S. Appl. No. 12/105,865, Attachment Pad with Thermal Reversible Adhesive and Methods of Making and Using the Same, filed Apr. 18, 2008.

Xie, U.S. Appl. No. 11/867,558, Multilayer Adhesive for Thermal Reversible Joining of Substrates, filed Oct. 4, 2007.

Xie, U.S. Appl. No. 12/391,704, Reversible Dry Adhesives for Wet adn Dry Conditions, filed Feb. 24, 2009.

Xie, U.S. Appl. No. 12/105,749, Method for Robotic Handling Using Thermo-Reversible Dry Adhesives, filed Apr. 18, 2008.

Xie, U.S. Appl. No. 12/105,788, Climbing Devices Based on Thermo-Reversible Dry Adhesives, filed Apr. 18, 2008.

\* cited by examiner

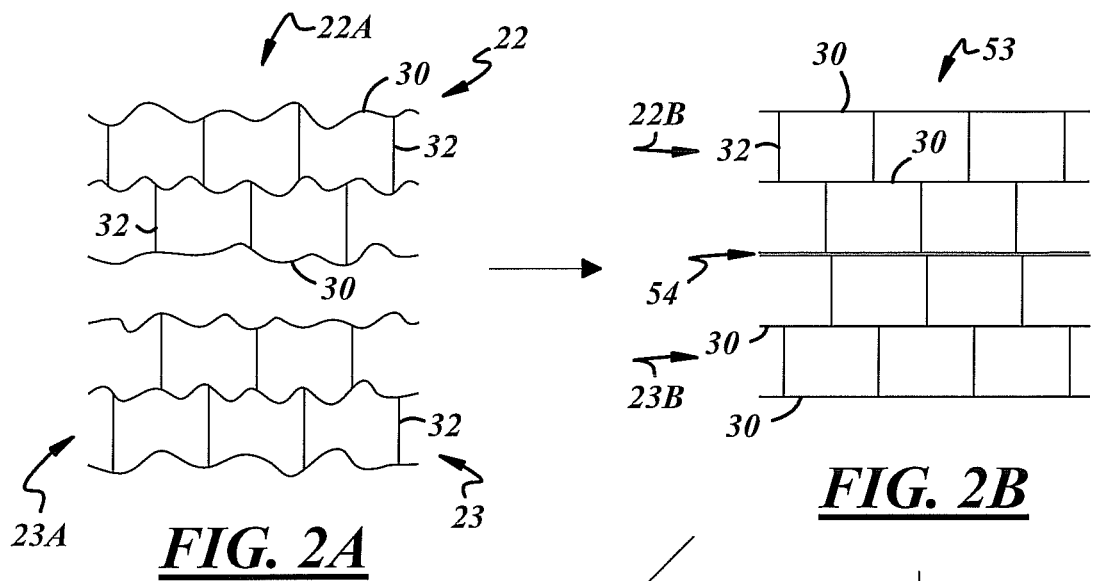
FIG. 2A  FIG. 2B
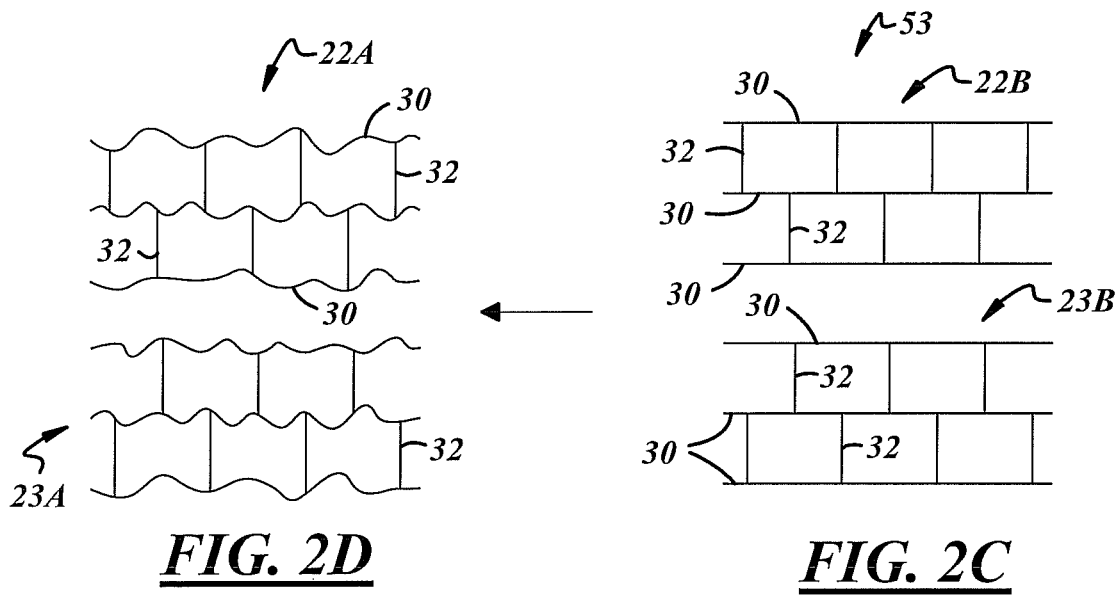
FIG. 2D  FIG. 2C

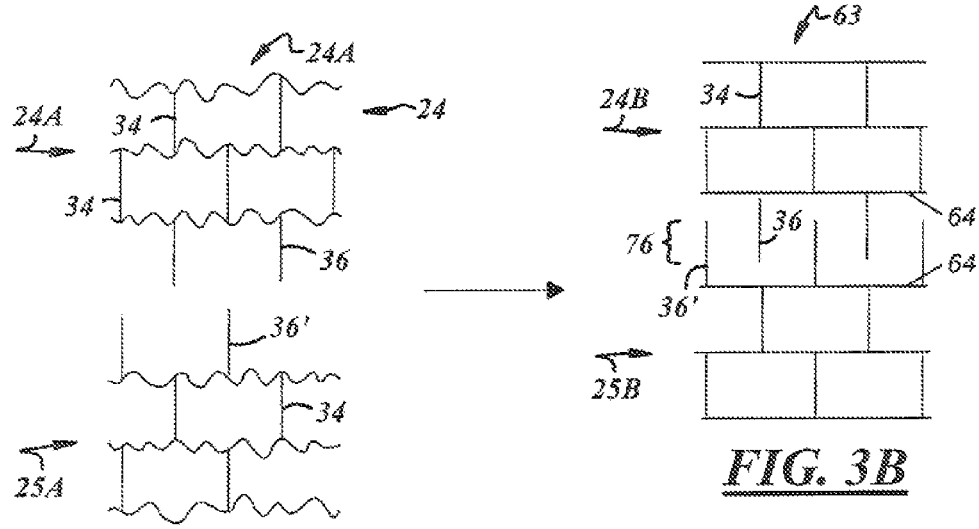
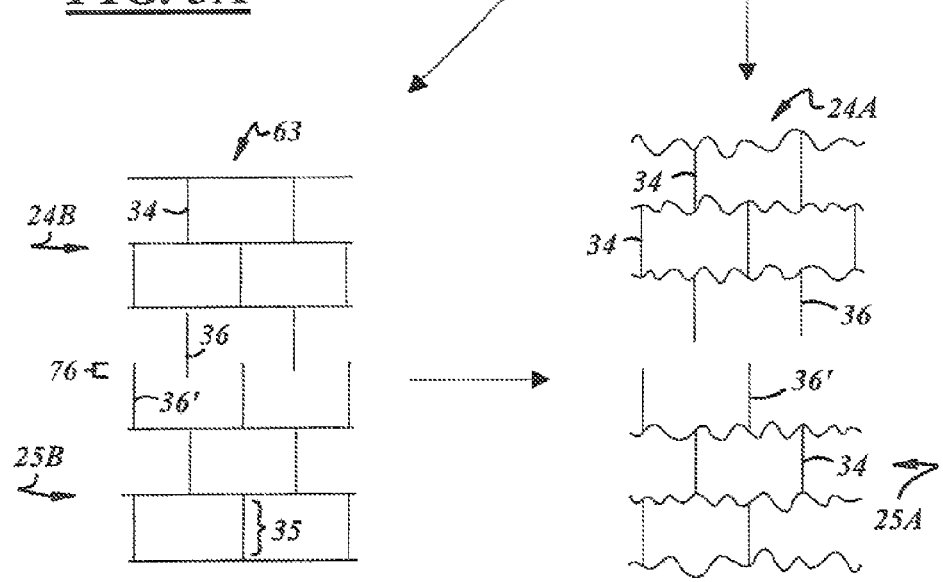

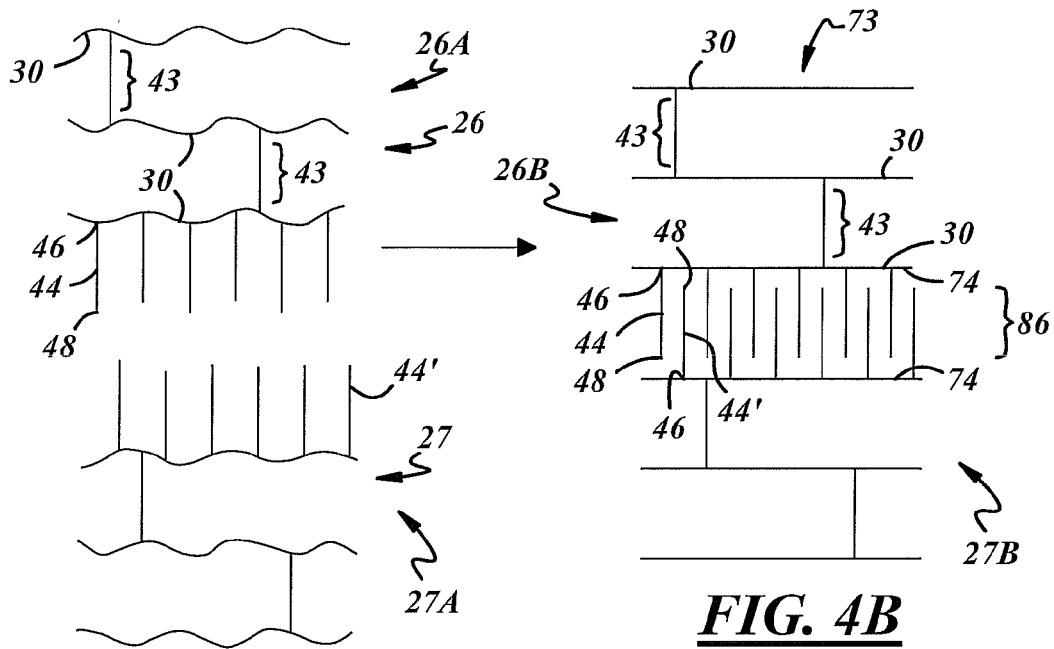
FIG. 4A
FIG. 4B
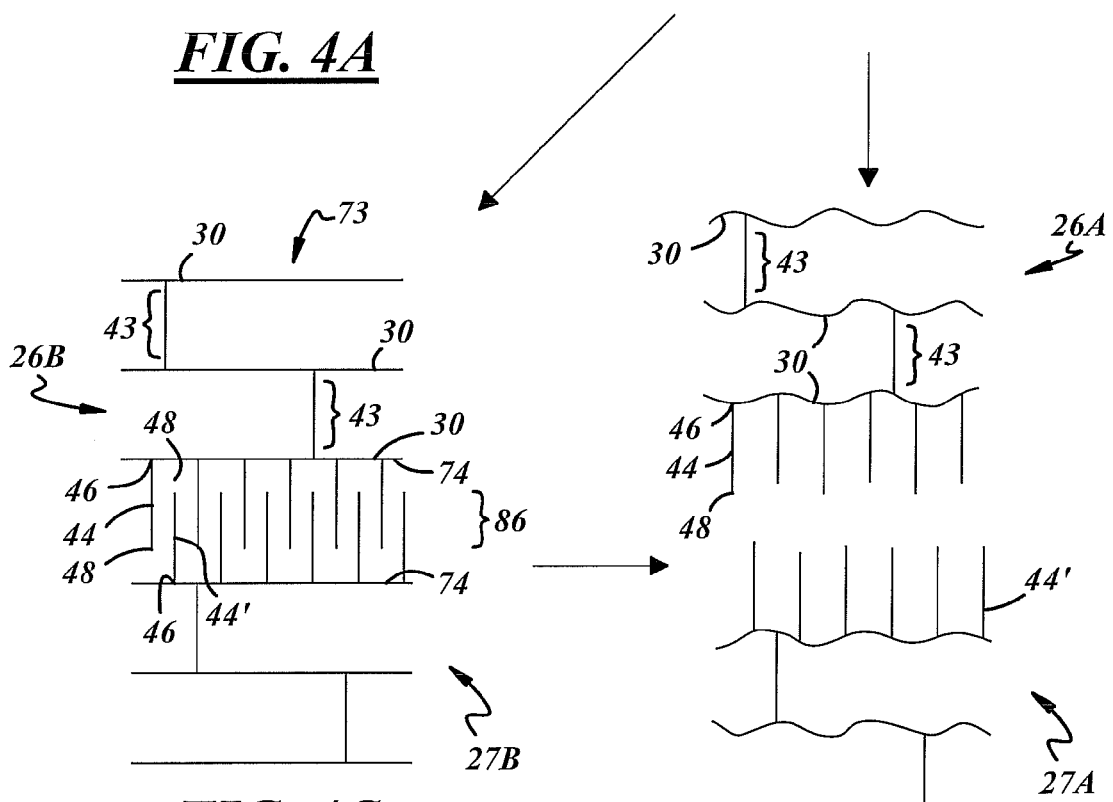
FIG. 4C
FIG. 4D

REVERSIBLE WELDING PROCESS FOR POLYMERS

TECHNICAL FIELD

The technical field generally relates to polymer coupling methods and more specifically to a reversible welding process for polymers.

BACKGROUND

Welding, or fusion welding, of thermoplastic polymer composites is a well-known process for joining composites. Fusion welding is accomplished wherein portions of the polymers to be joined are partially melted (or softened) to allow the polymer chains at the interface to diffuse into one another. The interdiffusion occurs in a large length scale, allowing chain entanglement to form at the interface. Essentially, two separated polymers become one. This polymer joining method is non-reversible, as it relies on the polymer chains at the interface to fuse into each other and form one phase.

SUMMARY OF EXEMPLARY EMBODIMENTS

One exemplary method includes providing a first shape memory polymer (SMP) and a second SMP each comprising chains with one free end and the other chain end attached to the polymer surfaces. The SMPs are each transformable between a permanent shape and a temporary shape; creating an adhesive bond between the first SMP and the second SMP, wherein the creating of the adhesive bond transforms SMP to its temporary shape and transforms the second SMP to its temporary shape; and wherein the at least one surface free side chain of the first SMP in its temporary shape is interdiffused with the at least one surface free side chain of the second SMP in its temporary shape to create the adhesive bond. Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein:

FIG. 2A illustrates two fully crosslinked SMP brought in close contact in their permanent shape;
FIG. 2B illustrates two fully crosslinked SMP of FIG. 2A transformed from their permanent shape to a temporary shape by heating above their shape memory transformation temperature and brought in close contact under a load;
FIG. 2C illustrates two fully crosslinked SMP of FIG. 2B maintained in their temporary shapes wherein the load has been removed;
FIG. 2D illustrates two fully crosslinked SMP chains of FIG. 2B transformed from their temporary shape to their permanent shape upon heating in the absence of a load;
FIG. 3A illustrates two partially crosslinked SMP brought in close contact in their permanent shape;
FIG. 3B illustrates two partially crosslinked SMP of FIG. 3A transformed from their permanent shape to a temporary shape by heating above their shape memory transformation temperature and brought in close contact under a load;
FIG. 3C illustrates two partially crosslinked SMP of FIG. 3B maintained in their temporary shapes wherein the load has been removed;
FIG. 3D illustrates two partially crosslinked SMP of FIG. 3B transformed from their temporary shape to their permanent shape upon heating in the absence of a load;
FIG. 4A illustrates two lightly crosslinked SMP brought in close contact in their permanent shape;
FIG. 4B illustrates two lightly crosslinked SMP of FIG. 4A transformed from their permanent shape to a temporary shape by heating above their shape memory transformation temperature and brought in close contact under a load;
FIG. 4C illustrates two lightly crosslinked SMP of FIG. 4B maintained in their temporary shapes wherein the load has been removed;
and
FIG. 4D illustrates two fully crosslinked SMP of FIG. 4B transformed from their temporary shape to their permanent shape upon heating in the absence of a load.

DETAILED DESCRIPTION OF EXEMPLARY EMBODIMENTS

The following description of the embodiment(s) is merely exemplary (illustrative) in nature and is in no way intended to limit the invention, its application, or uses.

SMPs represent responsive polymers that can fix to deformed temporary shapes and recover to their permanent (original) shapes only upon external stimuli. SMPs may be available exhibiting a dual shape memory effect (DSME), wherein the SMP can only memorize one temporary shape in addition to its permanent shape in each shape memory cycle. It is also contemplated that SMPs may be available exhibiting a triple shape memory effect (TSME) or greater, wherein the SMP can memorize two distinct temporary shapes (for a TSME) or more in addition to its permanent shape in each memory cycle.

In general, to transform an SMP from its permanent shape to its temporary shape, the permanent shape may be subject to external stimuli. For example, the SMP may be heated to a first elevated temperature and then deformed under stress to yield the first temporary shape, a shape which may be different in visual appearance from the permanent shape. By definition, the first elevated temperature is a temperature sufficiently high to ensure a phase transition of the SMP (i.e. is a temperature above the glass transition temperature ($T_g$) of SMP). The SMP may then be cooled under stress to a temperature below the glass transition temperature of one SMP, wherein the stress may be relieved while maintaining the first temporary shape. To recover the permanent shape from the first temporary shape, the SMP may be reheated to the first elevated temperature in the absence of stress.

Many crosslinked polymers also possess SMP properties. However, to adhere two polymer crosslinked SMP's together, it appears that good surface contact as well as interdiffusion may be prerequisites for good adhesive bonding.

Figure 1A:
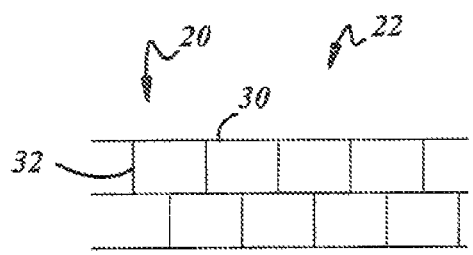
FIG. 1A illustrates a fully crosslinked SMP.
Figure 1B:
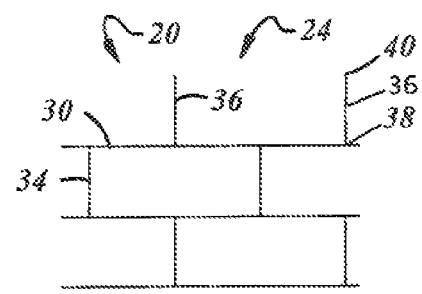
FIG. 1B illustrates a partially crosslinked SMP.
Figure 1C:
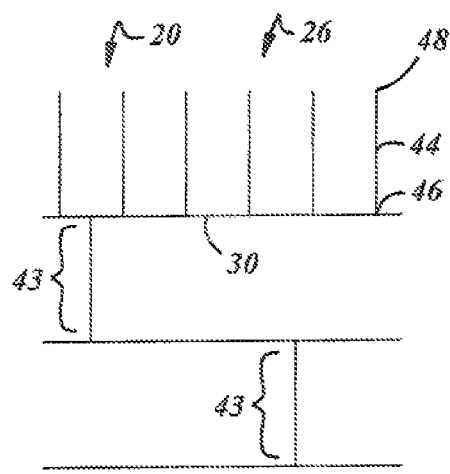
FIG. 1C illustrates a lightly crosslinked SMP.

Referring first to FIGS. 1A-1C, a crosslinked SMP polymer 20 may be illustrated as having three separate crosslinking densities, namely a fully crosslinked SMP polymer 22 as shown in FIG. 1A, a partially crosslinked SMP polymer 24 as shown in FIG. 1B, and a lightly crosslinked SMP polymer 26 as shown in FIG. 1C.

Each of the crosslinked SMP polymers 20 illustrated in FIGS. 1A-1C may include one or more polymeric backbone portions 30 and one or more free surface chain portions. For illustrative purposes and as shown in FIGS. 1A-1C, the composition of the polymeric backbone portions 30 of each respective SMP 22, 24, 26 may be virtually identical.

The fully crosslinked SMP polymer 22 as used herein and as shown in FIG. 1A, may be characterized wherein the molecular chains in the bulk are connected via crosslinking chain portions 32. In other words, there may be virtually no free side chain portions extending from any of the polymeric backbone portions 30.

The partially crosslinked SMP polymer 24 as used herein and as shown in FIG. 1B in its permanent shape, may be characterized wherein the molecular chains in the bulk are connected via crosslinking chain portions 34. In addition, the partially crosslinked SMP polymer 24 may include one or more additional free side chain portions 36 having a first end 38 coupled to the surface of 24 and a second end, or free end 40, that may not be reacted with a corresponding free side chain portion 36 of an adjacent polymeric backbone portion 30.

The lightly crosslinked SMP polymer 26 as used herein and as shown in FIG. 1C in its permanent shape, may be characterized wherein the molecular chains in the bulk are connected via crosslinking chain portions 43. In addition, the lightly crosslinked SMP polymer 26 may include one or more additional free side chain portions 44 having a first end 46 coupled to the surface of 30 and a second end, or free end 48, that may not be reacted with a corresponding free side chain portion 44 of an adjacent polymeric backbone portion 30.

The lightly crosslinked SMP polymer 26, by definition, has less crosslinked portions per unit area than the partially crosslinked SMP polymer 24 (i.e. there are more crosslinked portions 32 in the partially crosslinked SMP polymer 24 per unit area than corresponding crosslinked portions 43 in the lightly crosslinked SMP polymer 26). In addition, the lightly crosslinked SMP polymer 26 may be characterized wherein the length of the free side chain portions 44 are longer than the corresponding length of the free side chain portions 36 of the partially crosslinked SMP polymer 24.

FIGS. 2, 3 and 4 illustrate the process for bringing together two separate crosslinked SMP chains of FIGS. 1A-1C above to form an adhesive bond there between. The resultant bonded materials may have varying degrees of adhesive strength that depends on a function of the "shape" of the SMP polymer (i.e. whether in its permanent shape or in its temporary shape), the degree and type of crosslinking, and the length of available surface free chains for interdiffusion.

Referring first to FIG. 2A, two fully crosslinked SMP polymeric chains 22, 23 may be illustrated as being brought in close contact in their respective permanent shapes 22A, 23A in the absence of load. Here, the fully crosslinked SMP chains 22, 22 in their permanent shapes 22A, 23A may be macroscopically flat but microscopically rough rigid polymers.

Next, as shown in FIG. 2B, the fully crosslinked SMP chains 22, 23 of FIG. 2A have been heated to a temperature above their glass transition temperatures and placed under a load sufficient to transform the fully crosslinked SMP polymeric chains 22, 23 from their permanent shapes 22A, 23A to their temporary shape (i.e. hot pressed together), as shown by reference numerals 22B, 23B. The transformation to their temporary shapes 22B, 23B provides an interface 54, and hence better contact between the two chains 22B, 23B to form a bonded material 53.

However, while good contact at the interface 54 was achieved, little adhesive strength may be realized between the polymeric chains 22B, 23B in bonded material 53, thus allowing the two fully crosslinked SMP polymer chains in their temporary shapes 22B, 23B to be easily separated by cooling the SMP below the glass transition temperatures and subsequently removing the load, as shown in FIG. 2C, wherein the polymers were maintained in their temporary shapes 22B, 23B. A similar separation occurred if the bonded material 53 was maintained at a temperature above the glass transition temperatures of the polymers 22, 23 when the load was removed, as shown by the transformation from FIG. 2B to FIG. 2D, or when the SMP was cooled below the glass transition temperature, followed by a load removal, and then heated back above the glass transition temperature, as shown in the transformation from FIG. 2C to 2D, wherein the polymeric chains were transformed to their permanent shapes 22A, 23A.

Referring now to FIG. 3A, two partially crosslinked SMP 24, 25 may be shown in close proximity to one another in the absence of load in their permanent shape 24A, 25A. Here, the partially crosslinked SMP 24, 25 in their permanent shapes 24A, 25A may be macroscopically flat but microscopically rough rigid polymers.

Next, in FIG. 3B, the partially crosslinked SMP 24, 25 may have been heated to a temperature above their glass transition temperatures and placed under a load sufficient to transform the polymer chains from their permanent shapes 24A, 25A to their temporary shape, as shown by reference numerals 24B and 25B. The transition may provide an interface 64, and hence better contact between the two chains 24B, 25B to form a bonded material 63. In addition, the transformation from their permanent shapes 24A, 25A to their temporary shapes 24B, 25B may allow diffusion between the respective surface free side chain portion 36 to create an interdiffusion thin layer 76. The interdiffusion thin layer 76 includes a plurality of surface free chain portions 36, 36 from the first SMP 24B and second SMP 25B that are in an overlapping position in a common place.

In FIG. 3C, the polymeric chains may be allowed to cool below their glass transition temperatures under load, wherein the load was removed, thus maintaining the polymers in their temporary shapes 24B, 25B. As shown in FIG. 3C, the surface free chain portions 36, 36' may remain substantially frozen and interdiffused, thus possibly providing some degree of resistance from allowing the polymeric chains 24B, 25B to easily separate.

When the polymeric chains 24, 25 were heated back to a temperature above the glass transition temperature in the absence of load, as shown in the transformation from FIG. 3C to FIG. 3D, or when the load was removed while the polymers 24, 25 were maintained at a temperature above the glass transition temperature, as shown in the transformation from FIG. 3B to FIG. 3D, the polymers 24, 25 may be transformed back to their original permanent shapes 24A, 25A and allows frozen free side chain portions 36, 36' to become mobile, which may allow the polymers to separate.

Referring now to FIG. 4A, two lightly crosslinked SMP polymeric chains formed from the polymeric material 26, 27 shown in FIG. 2C may be brought in close contact in their permanent shapes 26A, 27A. Here, the lightly crosslinked SMP chains 26, 27 in their permanent shapes 26A, 27A may be macroscopically flat but microscopically rough rigid polymers.

Next, in FIG. 4B, the lightly crosslinked SMP chains 26, 27 may have been heated to a temperature above their glass transition temperatures and placed under a load sufficient to transform the polymer chains from their permanent shapes 26A, 27A to their temporary shapes, as shown by reference numerals 26B and 27B. The transition may provide an interface 74, and hence better contact between the two chains 26B, 27B to form a bonded material 73, or composite material 73. In addition, the transformation from their permanent shapes 26A, 27A to their temporary shapes 26B, 27B may allow diffusion between the respective free side chain portions 44, 44' to create a small interdiffusion layer 86. The degree of interdiffusion of the interdiffusion layer 86 in FIG. 4B may be greater than the degree of interdiffusion in interdiffusion layer 76 of FIG. 3B.

In FIG. 4C, the polymeric chains may be allowed to cool below their glass transition temperatures under load, wherein the load was removed, thus maintaining the polymers in their temporary shapes 26B, 27B. As shown in FIG. 4C, the surface free chain portions 44, 44' may remain substantially frozen, thus not allowing the polymeric chains 26B, 27B to easily separate. The degree of force necessary to separate the polymeric chains 26B, 27B in FIG. 4C may be greater than the degree of force necessary to separate the polymeric chains 24B, 25B of FIG. 3C (whose degree of force was greater than the force necessary to separate the polymeric chains 22B, 23B of FIG. 2C), which suggests the adhesive strength of the formed composite material 73 in FIG. 4C may be more than the corresponding adhesive strength of the bonded material 63 of FIG. 3C and the bonded material 53 of FIG. 2C.

This suggests that the degree of interdiffusion in the interdiffusion layers may contribute to the adhesive strength of the formed composite material. A greater degree of interdiffusion may lead to greater adhesive strength between the SMP in their temporary shapes. Along those lines, the degree of interdiffusion may be related the length of the surface free chain portions 44, 44'.

In addition, the degree of interdiffusion, and hence the adhesive strength of the polymers when reversibly coupled, may also be affected by the number of available free side chain portions per unit area of the shape memory polymer. The degree of interdiffusion corresponds to the amount of overlap, or intermingling, of the surface free chain portions when a pair of SMP are coupled. An increased number of available surface free side chain portions may increase the degree of interdiffusion. Conversely, a large amount of crosslinking of side chains in a shape memory polymer chain, and hence a smaller amount of available surface free chains, may reduce the degree of interdiffusion, and hence the adhesive strength.

When the polymer may be heated back to a temperature above the glass transition temperature in the absence of load, thus transforming the polymers back to their original permanent shapes 26A, 27A from their temporary shapes 26B, 27B as shown in the transformation from FIG. 4C to 4D, or wherein the load is simply removed while the chains 26B, 27B are maintained above their glass transition temperature, as shown in the transformation from FIG. 4B to 4D, the frozen free side chain portions 44, 44' may become mobile, thus allowing the polymer chains 26A, 27A to easily separate.

Thus, the exemplary embodiments illustrate that lightly crosslinked SMP chains having long and mobile side chain portions may be welded together to form composite material having a degree of adhesive strength. Moreover, by simply heating the SMP polymers in the absence of load to transform the SMP polymers back to their permanent shape, such coupled SMP polymers may be easily separated and subsequently rewelded.

Experimental Confirmation

Two lightly crosslinked polystyrene samples with identical crosslink density were produced by polymerizing a mixture of 0.5 weight percent BPO initiator and 2.0 mole percent of divinylbenzene with styrene at seventy-five degrees Celsius for about sixteen hours. The samples were sulfonated using concentrated sulfuric acid at ninety degrees Celsius for about 5 minutes. The sulfonated crosslinked polystyrene samples were pressed together at one hundred forty five degrees Celsius for about 30 minutes. After cooling under load, adhesive strength of 40 N/cm2 was obtained. The bonded samples, when subjected to heating back to one hundred forty five degrees Celsius, in the absence of load, separated from each other without any external separating force. Overall, such a phenomenon may be referred to as reversible welding.

When two fully crosslinked epoxy polymer samples were subjected to a similar bonding procedure under load, no measurable adhesion was obtained. This appears to confirm that presence of free chains on the polymer surface may be necessary to achieve interdiffusion of the polymer chains, and hence the reversible welding of the polymer chains together under load.

In another case, a sulfonated crosslinked polystyrene was hot pressed to a non-sulfonated crosslinked polystyrene. In this example, no adhesion was observed. This appears to confirm that the miscibility of the surface free chains may be an additional requirement for reversible welding.

The above description of embodiments of the invention is merely exemplary in nature and, thus, variations thereof are not to be regarded as a departure from the spirit and scope of the invention.

What is claimed is:

1. A method comprising:
providing a crosslinked first shape memory polymer in a first permanent shape, the crosslinked first shape memory polymer having a plurality of surface free chains each having one end coupled to the surface of the first shape memory polymer backbone and one free end, said first shape memory polymer transformable between a first permanent shape and a first temporary shape;
providing a crosslinked second shape memory polymer in a second permanent shape, the crosslinked second shape memory polymer having a plurality of surface free chains each having one end coupled to the surface of the second shape memory polymer backbone and one free end, said second polymer transformable between a second permanent shape and a second temporary shape; and
creating a reversible welding adhesive bond between said first polymer and said second polymer,
wherein said creating of said adhesive bond transforms said first polymer to said first temporary shape and transforms said second polymer to said second temporary shape, and
wherein at least one said surface free chain of said first shape memory polymer in said first temporary shape is interdiffused with at least one said surface free chain of said second shape memory polymer in said second temporary shape by said creation of said adhesive bond and wherein one of said first polymer or said second polymer comprises sulfonated crosslinked polystyrene.

2. The method of claim 1, wherein creating an adhesive bond between said first polymer and said second polymer comprises:
hot pressing said first polymer to said second polymer under a load to form a bonded material, wherein said hot pressing under said load transforms said first polymer to said first temporary shape and transforms said second polymer to said second temporary shape,
wherein said at least one surface free chain of said first polymer in said first temporary shape is interdiffused with said at least one surface free chain of said second polymer in said second temporary shape by said hot pressing under said load to form an interdiffused area;
cooling said bonded material to a temperature below a glass transition temperature for said first polymer and below a glass transition temperature for said second polymer while maintaining said load; and removing said load.

3. The method of claim 2, wherein cooling said bonded material to a temperature below a glass transition temperature for said first polymer and below a glass transition temperature for said second polymer causes said at least one surface free chain of said first polymer and said at least one surface free chain of said second polymer to become frozen within said interdiffused area.

4. The method of claim 2 further comprising:

breaking said adhesive bond by heating said bonded material above said glass transition temperature for said first polymer and said second polymer.

5. The method of claim 2 further comprising:

breaking said adhesive bond by transforming said first polymer to said first permanent shape from said first temporary shape and by transforming said second polymeric to said second permanent shape from said second temporary shape.

6. The method of claim 5, wherein said heating causes said at least one surface free chain of said first polymer and said at least one surface free chain of said second polymer to become mobile within said interdiffused area.

7. The method of claim 3 further comprising:

breaking said adhesive bond by heating said bonded material above said glass transition temperature for said first polymer and said second polymer, wherein said heating causes said at least one surface free chain of said first polymer and said at least one surface free chain of said second polymer to become mobile within said interdiffused area.

8. The method of claim 1, wherein said first polymer comprises a lightly crosslinked shape memory polymer.

9. The method of claim 8, wherein said second polymer comprises a lightly crosslinked shape memory polymer.

10. A method for increasing adhesive bond strength in bonded material formed from reversibly coupling together at least two crosslinked shape memory polymers having surface free chains; each of said surface free chains having one end coupled to the surface of the corresponding shape memory polymer backbone and one free end, the method comprising:

increasing the degree of interdiffusion between one or more surface free chains of a first one of the at least two shape memory polymers and one or more surface free chains of a second one of the at least two shape memory polymers when said at least two shape memory polymers are hot pressed together;

cooling said at least two shape memory polymers to a temperature below a glass transition temperature for each of said at least two shape memory polymers under a load to create a bonded material having an interdiffusion area between each respective pair of said at least two shape memory polymers, wherein the extent of said interdiffusion is a function of the degree of interdiffusion between said one or more surface free chains of a first one of the at least two shape memory polymers and said one or more surface free chains of a second one of the at least two shape memory polymers; and removing said load, wherein each of said at least two shape memory polymers has at least one temporary shape and one permanent shape, and said at least two shape memory polymers are hot pressed together under a load to be transformed to their corresponding temporary shapes and wherein said second polymer comprises a lightly crosslinked shape memory polymer, wherein said second polymer comprises sulfonated crosslinked polystyrene.

11. The method of claim 10, wherein the degree of interdiffusion is increased by increasing the length of said one or more surface free chains of said first one and said second one of said at least two shape memory polymers.

12. The method of claim 11, wherein the degree of interdiffusion is increased by decreasing the crosslinking density of at least one of said at least two shape memory polymers.

13. The method of claim 10, wherein each of said at least two shape memory polymers has at least one temporary shape and one permanent shape, and said at least two shape memory polymers are hot pressed together under a load to be transformed to their corresponding temporary shapes.

14. The method of claim 10, wherein cooling said at least two shape memory polymers to a temperature below a glass transition temperature causes said one or more surface free chains of said first one of the at least two shape memory polymers and said one or more surface free side chain of said second one of the at least two shape memory polymers to become less mobile.

15. A method comprising:

providing a crosslinked first shape memory polymer having a plurality of surface free chains each having one end coupled to the surface of the first shape memory polymer backbone and one free end, said first shape memory polymer transformable between a first permanent shape and a first temporary shape;

providing a crosslinked second shape memory polymer having a plurality of surface free chains each having one end coupled to the surface of the second shape memory polymer backbone and one free end, said second polymer transformable between a second permanent shape and a second temporary shape; and creating a reversible welding adhesive bond between said first polymer and said second polymer, wherein said creating of said adhesive bond transforms said first polymer to said first temporary shape and transforms said second polymer to said second temporary shape, and wherein at least one said surface free chain of said first shape memory polymer in said first temporary shape is interdiffused with at least one said surface free chain of said second shape memory polymer in said second temporary shape by said creation of said adhesive bond, wherein said first polymer comprises a lightly crosslinked shape memory polymer, wherein said first polymer comprises sulfonated crosslinked polystyrene.

16. A method comprising:

providing a crosslinked first shape memory polymer having a plurality of surface free chains each having one end coupled to the surface of the first shape memory polymer backbone and one free end, said first shape memory polymer transformable between a first permanent shape and a first temporary shape;

providing a crosslinked second shape memory polymer having a plurality of surface free chains each having one end coupled to the surface of the second shape memory polymer backbone and one free end, said second polymer transformable between a second permanent shape and a second temporary shape; and creating a reversible welding adhesive bond between said first polymer and said second polymer, wherein said creating of said adhesive bond transforms said first polymer to said first temporary shape and transforms said second polymer to said second temporary shape, and wherein at least one said surface free chain of said first shape memory polymer in said first temporary shape is interdiffused with at least one said surface free chain of said second shape memory polymer in said second temporary shape by said creation of said adhesive bond, wherein said first polymer comprises a lightly crosslinked shape memory polymer, wherein said second polymer comprises sulfonated crosslinked polystyrene.

* * * * *